US012402569B2

(12) United States Patent
Vadnere et al.

(10) Patent No.: US 12,402,569 B2
(45) Date of Patent: Sep. 2, 2025

(54) AUTOMATED LAST BALE EJECTION SEQUENCE FOR BALER IMPLEMENT

(71) Applicant: DEERE & COMPANY, Moline, IL (US)

(72) Inventors: Mohan A. Vadnere, Pune (IN); Umesh B. Jadhao, Pune (IN)

(73) Assignee: DEERE & COMPANY, Moline, IL (US)

( * ) Notice: Subject to any disclaimer, the term of this patent is extended or adjusted under 35 U.S.C. 154(b) by 547 days.

(21) Appl. No.: 18/045,681

(22) Filed: Oct. 11, 2022

(65) Prior Publication Data
US 2024/0114843 A1 Apr. 11, 2024

(51) Int. Cl.
A01F 15/08 (2006.01)
A01F 15/04 (2006.01)
A01F 15/14 (2006.01)

(52) U.S. Cl.
CPC ........ *A01F 15/0875* (2013.01); *A01F 15/042* (2013.01); *A01F 15/145* (2013.01)

(58) Field of Classification Search
None
See application file for complete search history.

(56) References Cited

U.S. PATENT DOCUMENTS

| | | | |
|---|---|---|---|
| 2009/0107102 A1 | 4/2009 | Biziorek | |
| 2013/0019765 A1* | 1/2013 | Demon | A01F 15/0875 100/218 |
| 2017/0273248 A1 | 9/2017 | Retzlaff et al. | |
| 2018/0228091 A1* | 8/2018 | Demon | A01F 15/08 |
| 2022/0312679 A1 | 10/2022 | Kulkarni | |
| 2023/0001661 A1* | 1/2023 | Dreher | B30B 9/3096 |

FOREIGN PATENT DOCUMENTS

| | | |
|---|---|---|
| EP | 0264497 A1 | 4/1988 |
| EP | 2548432 A1 | 1/2013 |
| EP | 4056005 A1 | 9/2022 |

OTHER PUBLICATIONS

Extended European Search Report and Written Opinion issued in European Patent Application No. 23193558.6, dated Feb. 15, 2024, in 10 pages.

* cited by examiner

*Primary Examiner* — Amelia Vorce

(57) ABSTRACT

A baler system includes a baler controller includes a processor operable to execute a bale ejection algorithm to receive a command input to initiate a last bale ejection sequence. Upon receiving the command input, the baler controller automatically engages a knotter system to wrap and bind crop material currently disposed within a baling chamber to form a final bale. Upon forming the final bale, the baler controller automatically determines if a discharge location disposed proximate a discharge end of the baling chamber is clear of obstructions. Upon determining that the discharge end of the baling chamber is clear of obstructions, the baler controller automatically engages a bale ejection system to eject the final bale from the baling chamber and onto the discharge location.

13 Claims, 6 Drawing Sheets

AUTOMATED LAST BALE EJECTION SEQUENCE FOR BALER IMPLEMENT

TECHNICAL FIELD

The disclosure generally relates to a baler system for forming a bale having a parallelepiped shape.

BACKGROUND

Agricultural balers gather, compress, and shape crop material into a bale. One exemplary baler implement is often referred to as a large square baler. Large square balers utilize a compression system including a gearbox with a crank arm and connecting rod which are attached to a reciprocating plunger. During each rotation of the crank arm, the reciprocating plunger compresses the crop in a baling or compression chamber into a flake as the plunger moves towards the rear of the baler. Multiple flakes are formed in sequence and then bound together with a plurality of twine strands by a knotter system while still in the baling chamber. The process repeats, whereby a subsequent bale pushes the proceeding bale out of the baling chamber through a rear exit of the baling chamber, whereby the proceeding bale is deposited, for example, on a ground surface or on a trailer.

At the end of a baling session, the crop material remaining in the baling chamber must be ejected through a separate process because there are no subsequent bales to push the remaining crop material out of the baling chamber. In order to eject the remaining crop material from the baling chamber at the end of a baling session, a last bale ejection sequence may be followed. The last bale ejection sequence is a manually executed operation performed by a user, and often takes considerable time to complete.

SUMMARY

A baler system is described herein. The baler system includes a baler implement including a baling chamber and a plunger moveable within the baling chamber in a reciprocating motion. The plunger is operable to compress crop material within the baling chamber into a formed bale having a parallelepiped shape. A knotter system includes a needle operable to wrap a twine strand around a periphery of the formed bale within the baling chamber, and a knotter operable to tie the twine strand to bind the crop material into the parallelepiped shape. The baler implement further includes a bale ejection system having an actuator and a bale engagement member. The actuator is selectively controllable to move the bale engagement member into contact with the formed and bound bale within the baling chamber, and thereafter move the bale engagement member to eject the formed and bound bale from the baling chamber through a discharge end of the baling chamber. A baler controller includes a processor and a memory having a bale ejection algorithm stored thereon. The processor is operable to execute the bale ejection algorithm to receive a command input to initiate a last bale ejection sequence. Upon receiving the command input, the baler controller automatically engages the knotter system to wrap and bind crop material currently disposed within the baling chamber to form a final bale. Upon forming the final bale, the baler controller automatically determines if a discharge location disposed proximate the discharge end of the baling chamber is clear of obstructions or is not clear of obstructions. Upon determining that the discharge end of the baling chamber is clear of obstructions, the baler controller automatically engages the bale ejection system to eject the final bale from the baling chamber and onto the discharge location.

In one aspect of the disclosure, the processor is operable to execute the bale ejection algorithm to display a last bale eject initiation window on a touch screen display. A user may enter the command input by touching the last bale eject initiation window to initiate the last bale ejection sequence. In one implementation, the touch screen display may be incorporated into an associated work vehicle, e.g., a tractor, coupled to the baler implement.

In one aspect of the disclosure, upon receiving the command input and prior to engaging the knotter system, the processor may be operable to execute the bale ejection algorithm to automatically determine if a pre-set condition is satisfied or if the pre-set condition is not satisfied. The pre-set condition may include, but is not limited to, one or more safety features associated with the baler implement and/or an associated tow vehicle, e.g., a tractor. The one or more safety features may include, but are not limited to, a defined transmission position of the associated tow vehicle, an engine operation status of the associated tow vehicle, a flywheel brake of a transmission of the baler implement, a defined position of a bale chute adjacent the discharge end of the baling chamber, a defined position of one or more access panels of the baler implement, an orientation of the baler implement relative to gravity, a location within a work field, etc.

In one aspect of the disclosure, the processor may be operable to execute the bale ejection algorithm to automatically abort the last bale ejection sequence when the pre-set condition is not satisfied. When the pre-set condition is not satisfied and the last bale ejection sequence is aborted, the processor may be operable to automatically display an abort notice on a display. The abort notice may indicate that the last bale ejection sequence has been aborted because the pre-set condition is not satisfied. The abort notice may include a proceed window via which the user may enter a command to continue the last bale ejection sequence once the pre-set condition has been satisfied and/or remedied.

In one aspect of the disclosure, upon receiving the command input, the processor may be operable to execute the bale ejection algorithm to automatically connect torque communication between a power supply and the baler implement to power the plunger and the knotter system. For example, the baler controller may automatically engage a Power Take-Off of an associated tow vehicle, e.g., a tractor, through which rotational power and torque are supplied to the baler implement to power the plunger and the knotter system.

In one aspect of the disclosure, the processor may be operable to execute the bale ejection algorithm to automatically disengage the plunger from the final bale after the knotter system has bound the final bale with the twine strand. After disengaging the plunger from the final bale, the processor may be operable to execute the bale ejection algorithm to automatically disconnect torque communication between the power supply and the baler implement. For example, once the final bale has been bound by the knotter system and the plunger withdrawn from the final bale to relieve pressure against the final bale, the baler controller may disengage a Power Take-Off of an associated tow vehicle, e.g., a tractor, through which the supply of rotational power and torque to the baler implement are discontinued.

In one aspect of the disclosure, the processor may be operable to execute the bale ejection algorithm to automatically engage the bale ejection system by repeatedly controlling the actuator of the bale ejection system between an extended position and a retracted position. The actuator may be repeatedly moved between the extended position and the retracted position until the final bale is fully ejected from the baler implement and deposited at the discharge location. In one implementation of the disclosure, the actuator may include, but is not limited to, a linear actuator, e.g., a hydraulic cylinder or an electric linear actuator, that cycles between the extended position and the retracted position. Each respective cycle of the actuator, i.e., retraction and extension, may move the bale a defined distance. The final bale may be fully ejected from the baling chamber by repeating this cycle.

In one aspect of the disclosure, upon determining that the discharge location is not clear of obstructions, the processor may be operable to execute the bale ejection algorithm to automatically abort the last bale ejection sequence. The baler controller may automatically display an abort notice on a display indicating that the last bale ejection sequence has been aborted because the discharge location is not clear of obstructions. In one implementation, the processor may be operable to execute the bale ejection algorithm to automatically cancel the abort notice when the obstruction is no longer detected in the discharge location. In another implementation, the abort notice may include a proceed window via which the user may enter a command to continue the last bale ejection sequence once the obstruction has been removed and/or the baler implement has been relocated away from the obstruction.

In one aspect of the disclosure, the processor may be operable to execute the bale ejection algorithm to display a status window on a user interface or a display indicating a current status of the bale ejection sequence. The status window may automatically update as the baler controller automatically moves the various steps of the last bale ejection sequence, such that the user may know the current status of the final bale and the baler implement.

Accordingly, the baler system described herein provides a convenient process for the user to more quickly and easily eject the final bale of the baling session. The system described herein automates the last bale ejection process and incorporates automated safety checks into the last bale ejection sequence.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
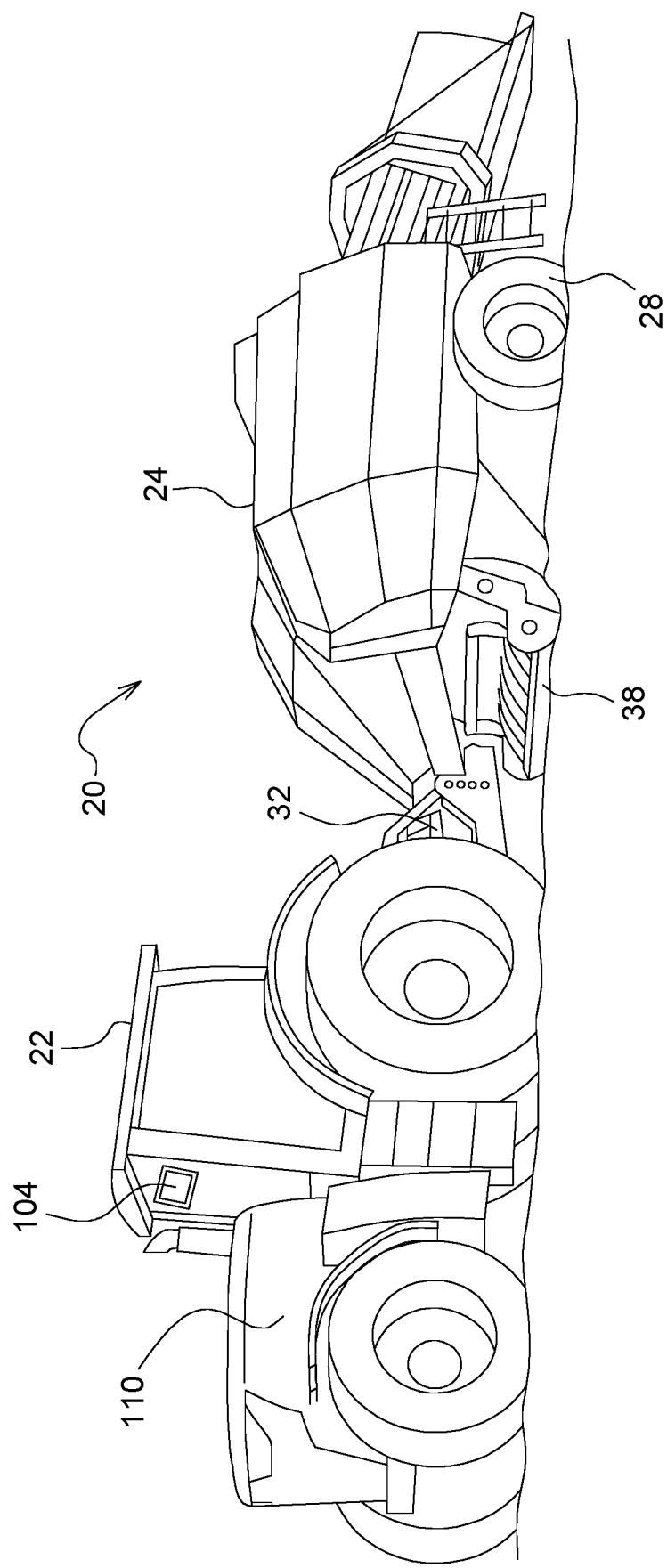
FIG. 1 is a schematic perspective view of a baler system.

Referring to the Figures, wherein like numerals indicate like parts throughout the several views, a baler system is generally shown at 20 in FIG. 1. Referring to FIG. 1 the baler system 20 is shown configured as a traction unit 22 pulling a baler implement 24. However, it should be appreciated that the teachings of this disclosure may be applied to other baler platforms, and are not limited to the example implementation of the baler system 20 shown in the Figures and described herein.

As shown in FIG. 1, the traction unit 22 may include, but is not limited to, a tractor. The traction unit 22 is coupled to the baler implement 24 for pulling and powering the baler implement 24. However, it should be appreciated that in other embodiments, the baler implement 24 may be self-propelled, in which case the traction unit 22 and the baler implement 24 are configured as a single, self-propelled vehicle.

As depicted in FIG. 1, the baler implement 24 is configured as a large square baler. The baler implement 24 may move across a field and gather and process crop material to form a bale. The baler implement 24 may then eject the formed bale from a rear of the baler implement 24.

Figure 2:
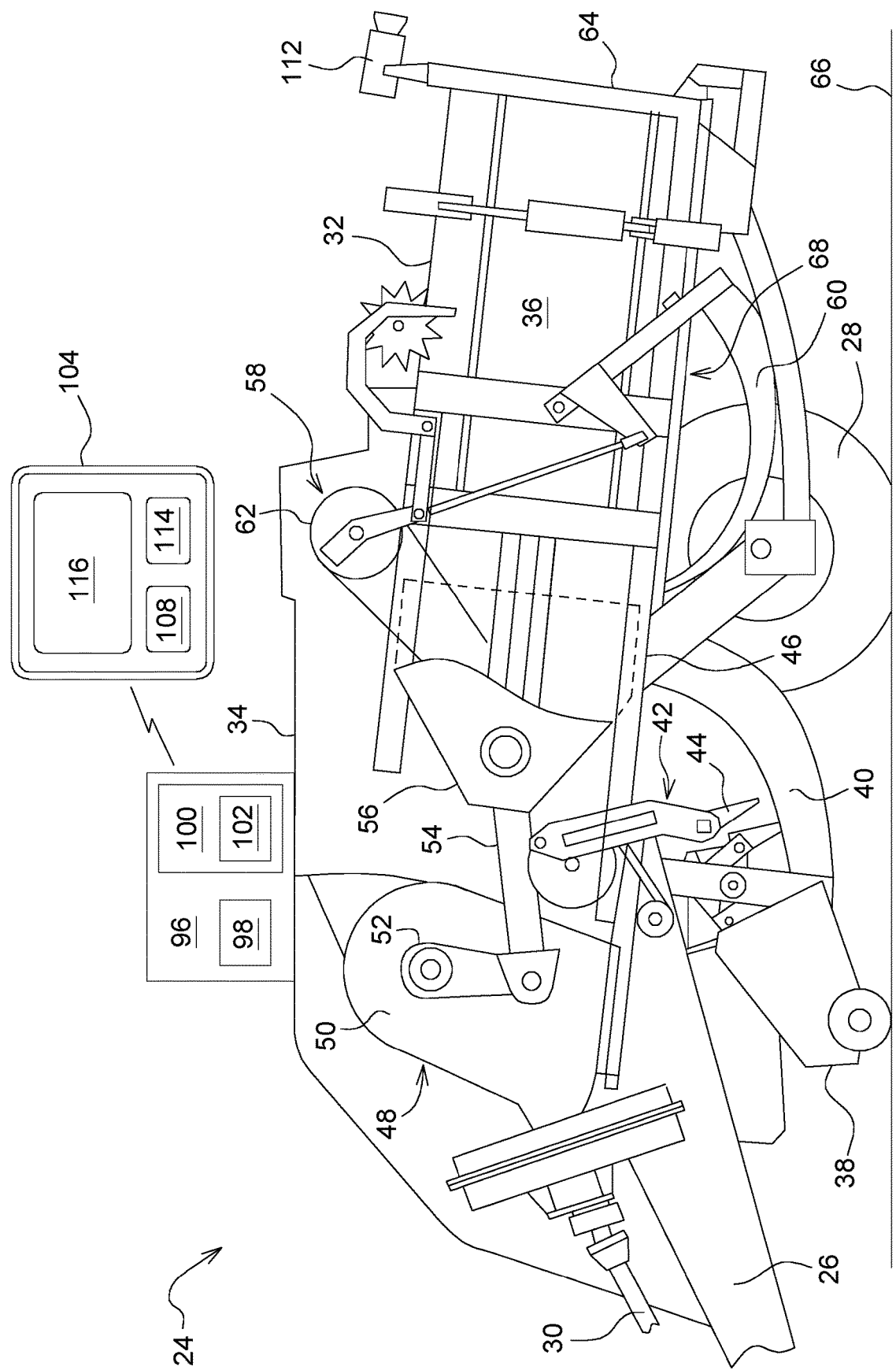
FIG. 2 is a schematic side view of a baler implement.

Referring to FIG. 2, the exemplary implementation of the baler implement 24 includes a frame 26, ground engaging devices 28, such as but not limited to wheels, and an input shaft 30, such as a power-take-off (PTO) shaft, which can receive rotational power and/or torque from a power supply 110, such as through a PTO output 32 (shown in FIG. 1) of the traction unit 22.

The baler implement 24 includes a housing 34 or body, which generally shields various internal components of the baler implement 24. The housing 34 is attached to and supported by the frame 26. The housing 34 includes multiple wall sections or panels that form and/or define a baling chamber 36. The baling chamber 36 may alternatively be referred to as a compression chamber for forming the bale.

The baler implement 24 includes a pick-up mechanism 38. The pick-up mechanism 38 is disposed proximate a forward end of the frame 26. The pick-up mechanism 38 gathers crop material from the ground surface and directs the gathered crop material toward and into a pre-compression passageway 40, which stores a volume of gathered crop material. A feeder system 42 includes a plurality of forks 44, which are timed to move the crop material from the pre-compression passageway 40 into the baling chamber 36 through an inlet 46 of the baling chamber 36. The pickup may include, but is not limited to tines, forks 44, augers, conveyors, baffles, etc., for gathering and moving the crop material. The baler implement 24 may be equipped with a pre-cutter, disposed between the pickup and the pre-compression passageway 40. As such, the pre-cutter is disposed downstream of the pickup and upstream of the inlet 46 relative to a direction of travel of the crop material. The pre-cutter cuts or chops the crop material into smaller pieces.

The input shaft 30 or PTO shaft is connected to an input of a transmission 48 to provide rotational power to the baler implement 24 from the traction unit 22 or other associated vehicle or power source. The transmission 48 includes a gearbox 50 which converts the rotational motion of the input shaft 30 along a generally longitudinal axis 80 of the baler implement 24 to an output of the transmission 48 having a rotational motion along a generally transverse axis of the baler implement 24.

The baler implement 24 includes a crank arm 52 connected to the output of the transmission 48. A connecting link 54 interconnects the crank arm 52 and a plunger 56. The crank arm 52 rotates based upon the output of the transmission 48 and the plunger 56 moves in a reciprocal motion within the baling chamber 36 as the crank arm 52 rotates. The plunger 56 extends into the baling chamber 36, thereby compressing the crop material, and then at least partially retracts from the baling chamber 36, at which time the feeder moves more crop material from the pre-compression passageway 40 into the baling chamber 36.

When the bale is formed within the baling chamber 36, a knotter system 58 wraps a plurality of twine strands around the bale to secure the shape of the bale. The knotter system 58 includes a plurality of needles 60, one needle 60 per twine strand, that are operable to wrap the twine strands around a periphery of the formed bale within the baling chamber 36. The twine strands are wrapped around a longitudinal extend or longest length of the bale, with each individual twine strand encircling the bale. The knotter system 58 further includes a plurality of knotters 62, one knotter 62 per twine strand, that are operable to tie each end of the respective twine strands together to form a knot, securing each respective twine strand in place to bind the crop material into the parallelepiped shape of the bale.

In the example implementation shown in the figures and described herein, a completed bale is pushed off a rearward discharge end 64 of the baler implement 24 by a subsequently formed bale, whereby the bale is deposited at a discharge location 66, e.g., the ground surface or onto a trailer. Since the last bale formed during a baling session does not have any subsequent bales to push it out of the baling chamber 36, a bale ejection system 68 may be used to discharge the last bale of the baling session off the rearward end of the baler implement 24.

Figure 3:
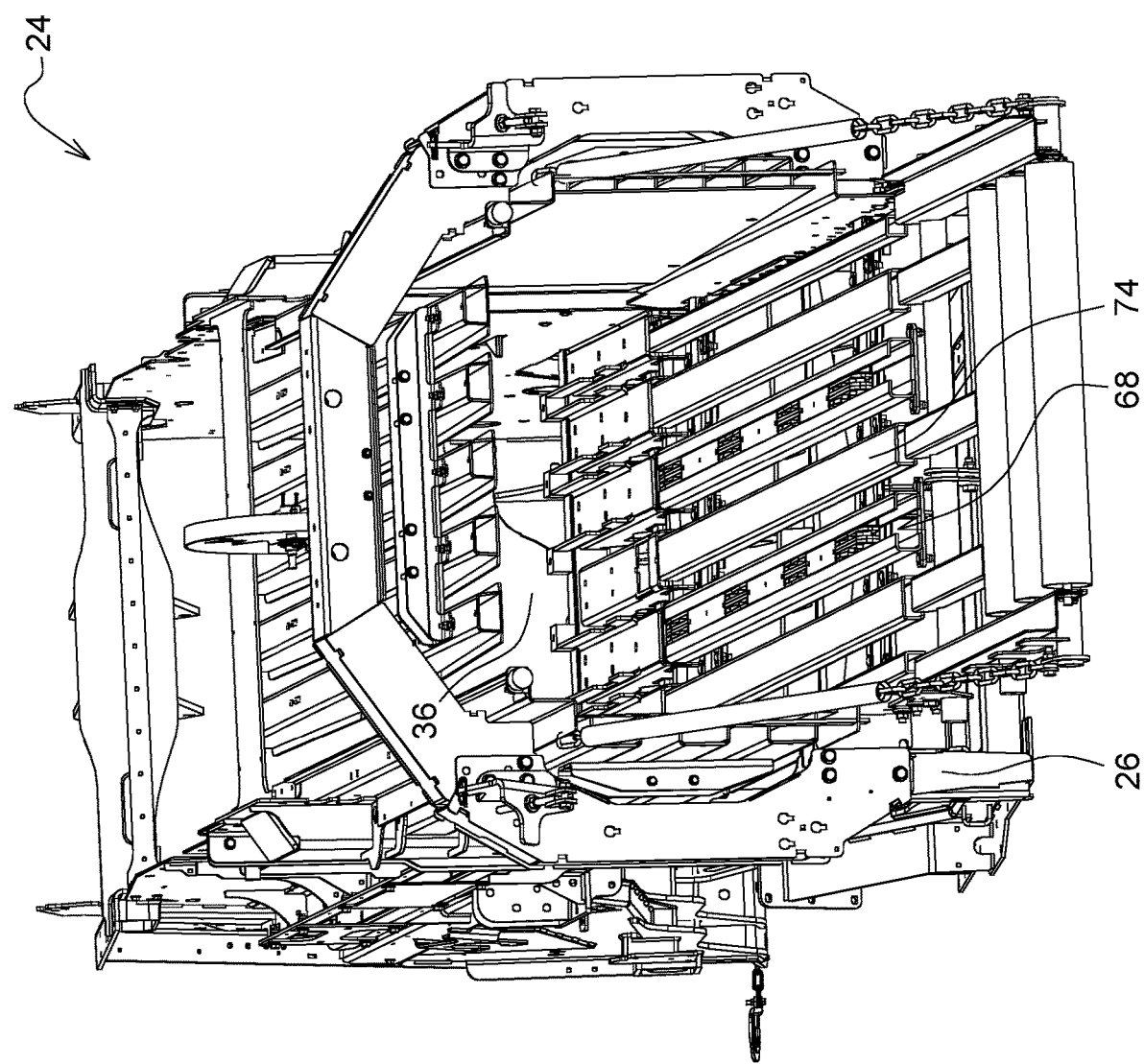
FIG. 3 is a schematic perspective view of a bale ejection system.
Figure 4:
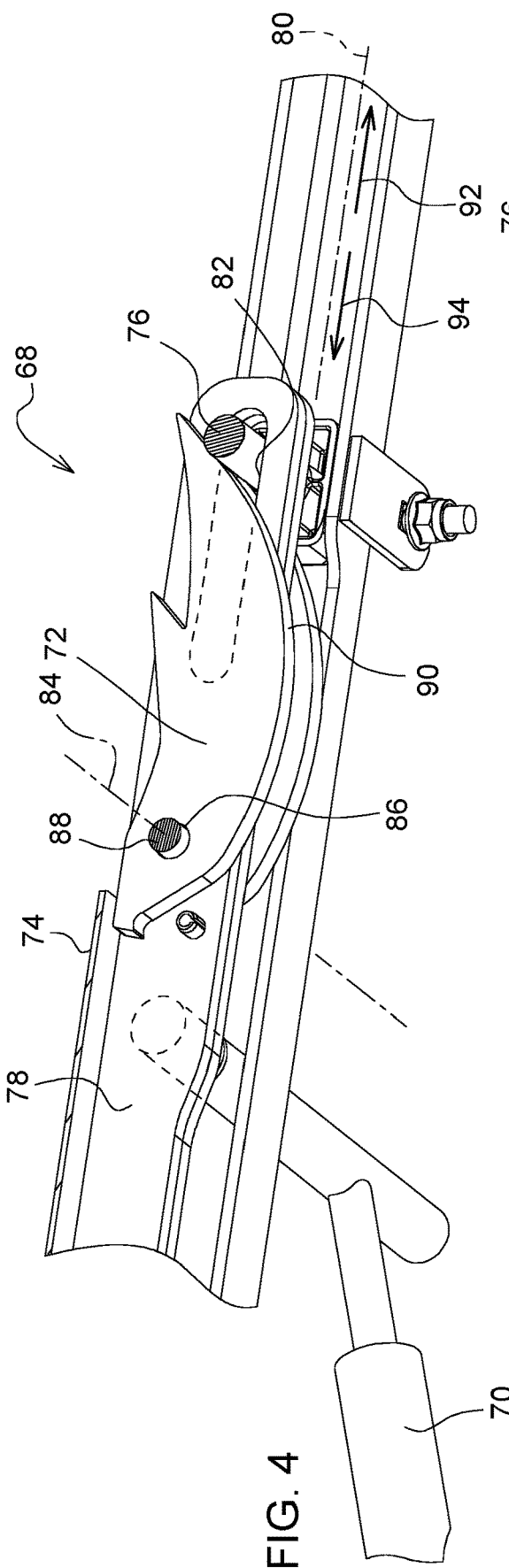
FIG. 4 is a schematic perspective view of the bale ejection system showing a bale engaging member in a retracted position.
Figure 5:
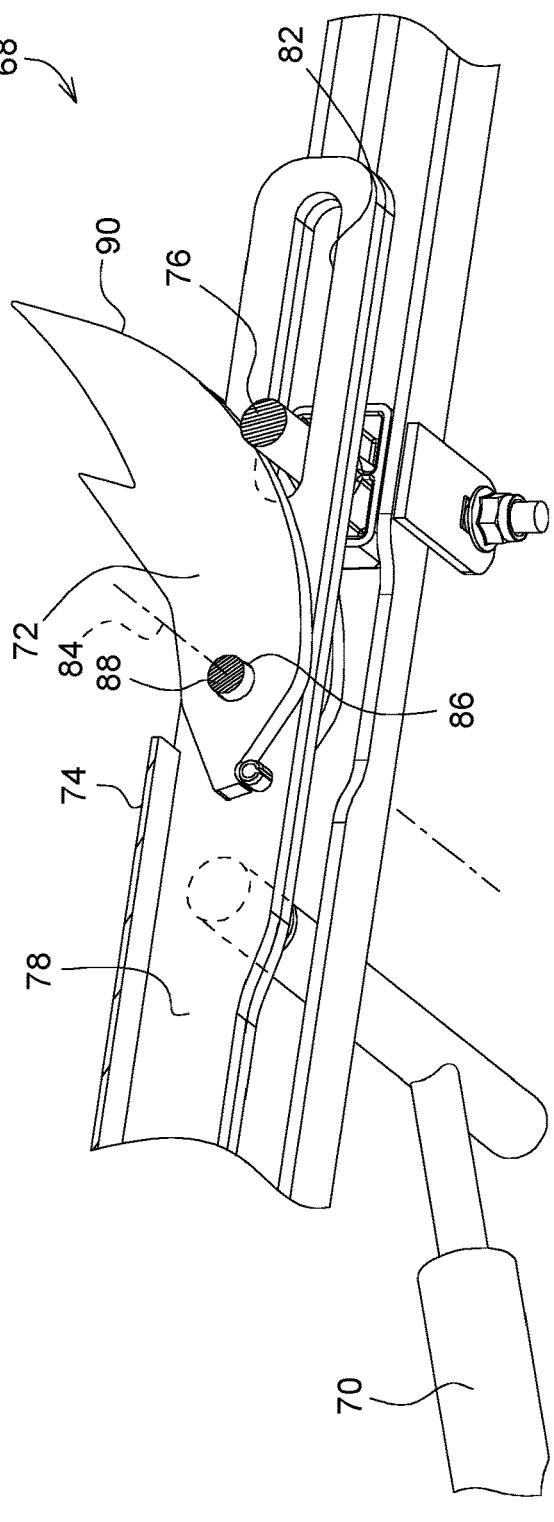
FIG. 5 is a schematic perspective view of the bale ejection system showing the bale engaging member in an engaged position.

Referring to FIGS. 3-5, the bale ejection system 68 includes an actuator 70 and a bale engagement member 72. The actuator 70 is selectively controllable to move the bale engagement member 72 into contact with the formed and bound bale within the baling chamber 36. Once the bale engagement member 72 is engaged with the bale, the actuator 70 moves the bale engagement member 72 and thereby the bale toward a discharge end 64 of the baler implement 24 to eject the formed and bound bale from the baling chamber 36 through the discharge end 64 of the baling chamber 36.

Referring to FIG. 3, an example implementation of the bale ejection system 68 is shown incorporated into a bottom wall 74 of the baling chamber 36. However, it should be appreciated that in other implementations, the bale ejection system 68 may be incorporated into additional or other wall panels of the baling chamber 36, and may be configured differently than the example implementation shown in the Figures and described herein.

Referring to FIGS. 4 and 5, a pin 76 is secured to the frame 26. The pin 76 extends generally transverse or perpendicular to a longitudinal axis 80 of the frame 26. The pin 76 may be attached to the frame 26 directly or indirectly, and remains stationary relative to the frame 26. A carrier 78 is coupled to the frame 26. The carrier 78 is moveable relative to the frame 26 along the longitudinal axis 80 of the frame 26. The carrier 78 may be moveably coupled to the frame 26 in a suitable manner the enables longitudinal movement relative to the frame 26. For example, the carrier 78 may be slidably mounted to the frame 26. The carrier 78 defines an elongated slot 82 that extends along the longitudinal axis 80 of the frame 26. The pin 76 extends through the elongated slot 82. The carrier 78 is moveable relative to the pin 76, such that the pin 76 may move within the elongated slot 82.

The actuator 70 may interconnect the frame 26 and the carrier 78. The actuator 70 may be controllable to extend and retract to move the carrier 78 relative to the frame 26 along the longitudinal axis 80 of the frame 26. The actuator 70 may include, but is not limited to, a hydraulic linear actuator 70, a pneumatic linear actuator 70, an electric linear actuator 70, etc. Additionally, the actuator 70 may include a linear or non-linear actuator 70 that is coupled to one or more gears and/or levers to effectuate linear movement of the carrier 78 along the longitudinal axis 80, such as but not limited to an electric motor, a hydraulic motor, etc.

The bale engagement member 72 is attached to and moveable with the carrier 78 along the longitudinal axis 80 and relative to the frame 26. The bale engagement member 72 is rotatably attached to the carrier 78 for rotation bout a rotation axis 84. The rotation axis 84 is generally perpendicular to the longitudinal axis 80. The bale engagement member 72 includes a mounting bore 86 that extends therethrough. The mounting bore 86 is parallel with the rotation axis 84. A fastener 88, such as but not limited to a bolt, shaft, rivet, etc., may extend through they mounting bore 86 and secure the bale engagement member 72 to the carrier 78. A center of the mounting bore 86 defines the rotation axis 84.

The bale engagement member 72 includes a cam surface 90 disposed in contacting or abutting engagement with the pin 76. Movement of the carrier 78 and the bale engagement member 72 along the longitudinal axis 80 moves the cam surface 90 against the pin 76. Movement along the longitudinal axis 80 of the cam surface 90 on the pin 76 causes the bale engagement member 72 to rotate about the rotation axis 84 between a retracted position, show in FIG. 4, and an engaged position, shown in FIG. 5. When disposed in the retracted position, the bale engagement member 72 is positioned on an exterior side of the baling chamber 36. When disposed in the engaged position, the bale engagement member 72 extends into the baling chamber 36.

Initial movement of the carrier 78 and the bale engagement member 72 in a rearward direction 92 moves the bale engagement member 72 from the retracted position, shown in FIG. 4, into the engaged position, shown in FIG. 5. It should be appreciated that the rearward direction 92 is a direction moving toward the rearward or discharge end 64 of the frame 26. When the bale engagement member 72 is positioned in the engaged position, the bale engagement member 72 extends into the baling chamber 36 for engaging crop material of the formed bale and moving the bale with the bale engagement member 72 and the carrier 78. Once the bale engagement member 72 is disposed in the engaged position, continued movement of the carrier 78 rearward along the longitudinal axis 80, maintains engagement between the bale engagement member 72 and the bale and moves the bale rearward relative to the baling chamber 36 to eject the bale.

Initial movement of the carrier 78 and the bale engagement member 72 in a forward direction 94 along the longitudinal axis 80, causes the bale engagement member 72 to rotate and move from the engaged position, shown in FIG. 5, into the retracted position, shown in FIG. 4. It should be appreciated that the forward direction 94 is a direction moving toward the forward end of the frame 26. When the bale engagement member 72 is disposed in the retracted position, the bale engagement member 72 is positioned outside the baling chamber 36 and does not engage the bale. Once the bale engagement member 72 is disposed in the retracted position, continued movement of the carrier 78 forward along the longitudinal axis 80, maintains dis-engagement between the bale engagement member 72 and the bale and moves the carrier 78 and the bale engagement member 72 relative to the baling chamber 36 to reset the carrier 78 and the bale engagement member 72 for a subsequent ejection stroke. The above described process may be repeated several times until the bale is ejected from the baling chamber 36.

It should be appreciated that the bale ejection system 68 may differ from the example implementation described above. For example, in other implementations, the bale ejection system 68 may include rotary actuator 70 that drives an endless chain or belt. The bale engagement member 72 may be attached to and rotate with the endless chain. As the endless chain moves through its cycle, the bale engagement member 72 may be rotating into the baling chamber 36 and into engagement with the bale, whereby the bale is moved rearward with the bale engagement member 72. The bale engagement member 72 may then be rotated out of the baling chamber 36 and returned to the beginning of the cycle to operating in an endless loop.

The baler system 20 further includes a baler controller 96. The baler controller 96 is disposed in communication with the baler implement 24 to operate the plunger 56, the knotter system 58, and the bale ejection system 68. While the baler controller 96 is generally described herein as a singular device, it should be appreciated that the baler controller 96 may include multiple devices linked together to share and/or communicate information therebetween. Furthermore, it should be appreciated that the baler controller 96 may be located on the baler implement 24 or located remotely from the baler implement 24, such as on the associated traction unit 22.

The baler controller 96 may alternatively be referred to as a computing device, a computer, a controller, a control unit, a control module, a module, etc. The baler controller 96 includes a processor 98, a memory 100, and all software, hardware, algorithms, connections, sensors, etc., necessary to manage and control the operation of the baler implement 24. As such, a method may be embodied as a program or algorithm operable on the baler controller 96. It should be appreciated that the baler controller 96 may include any device capable of analyzing data from various sensors, comparing data, making decisions, and executing the required tasks.

As used herein, "baler controller 96" is intended to be used consistent with how the term is used by a person of skill in the art, and refers to a computing component with processing, memory, and communication capabilities, which is utilized to execute instructions (i.e., stored on the memory 100 or received via the communication capabilities) to control or communicate with one or more other components. In certain embodiments, the baler controller 96 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The baler controller 96 may be in communication with other components on the traction unit 22 and/or the baler implement 24, such as hydraulic components, electrical components, and operator inputs within an operator station of the associated traction unit 22. The baler controller 96 may be electrically connected to these other components by a wiring harness such that messages, commands, and electrical power may be transmitted between the baler controller 96 and the other components. Although the baler controller 96 is referenced in the singular, in alternative embodiments the configuration and functionality described herein can be split across multiple devices using techniques known to a person of ordinary skill in the art.

The baler controller 96 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 100 may include any non-transitory/tangible medium which participates in providing data or computer-readable instructions. The memory 100 may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The baler controller 96 includes the tangible, non-transitory memory 100 on which are recorded computer-executable instructions, including a bale ejection algorithm 102. The processor 98 of the baler controller 96 is configured for executing the bale ejection algorithm 102. The bale ejection algorithm 102 implements a method of ejecting a last bale from the baler implement 24.

Figure 7:
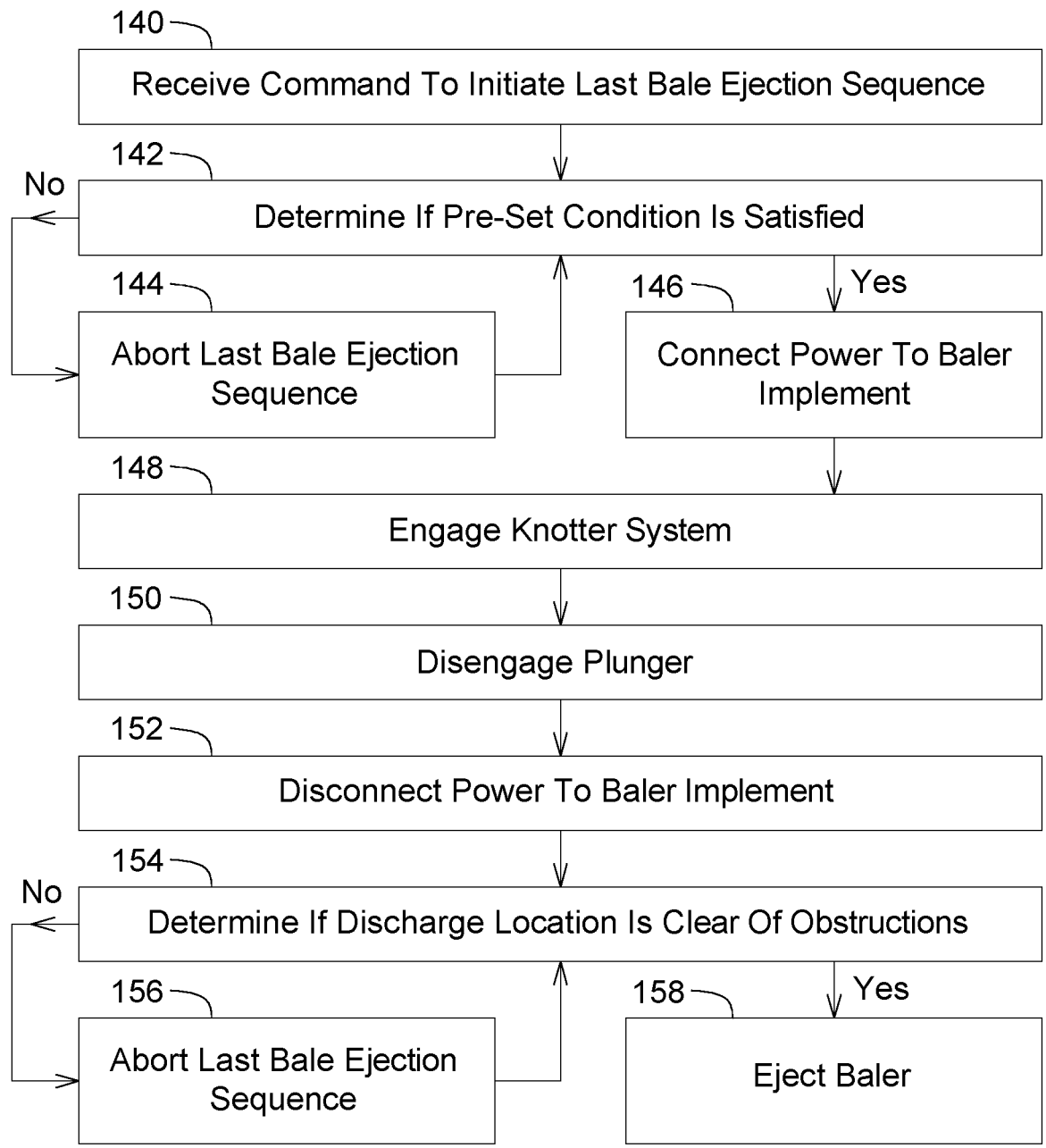
FIG. 7 is a flowchart representing a last bale ejection sequence.

Referring to FIG. 7, the baler controller 96 is configured to receive a command input to initiate a last bale ejection sequence. The step of receiving the command input is generally indicated by box 140 shown in FIG. 7. For example, the baler controller 96 may display a last bale eject initiation window 106 on a touch screen display 104 of the associated traction unit 22. A user may enter the command input by touching the last bale eject initiation window 106 on the touch screen display 104 to initiate the last bale ejection sequence. It should be appreciated that the baler controller 96 may receive the command input via some other input device and in some other manner not described herein.

Upon receiving the command input the baler controller 96 initiates the last bale ejection sequence. The last bale ejection sequence includes the baler controller 96 automatically determining if a pre-set condition is satisfied or if the pre-set condition is not satisfied. The step of determining if the pre-set condition is satisfied is generally indicated by box 142 shown in FIG. 7. The pre-set condition may include, but is not limited to, one or more safety features associated with the baler implement 24 and/or an associated tow vehicle, e.g., a tractor. The one or more safety features may include, but are not limited to, a defined transmission 48 position of the associated tow vehicle, an engine operation status of the associated tow vehicle, a flywheel brake of the transmission 48 of the baler implement 24, a defined position of a bale chute adjacent the discharge end 64 of the baling chamber 36, a defined position of one or more access panels of the baler implement 24, an orientation of the baler implement 24 relative to gravity, a location within a work field, etc.

Figure 6:
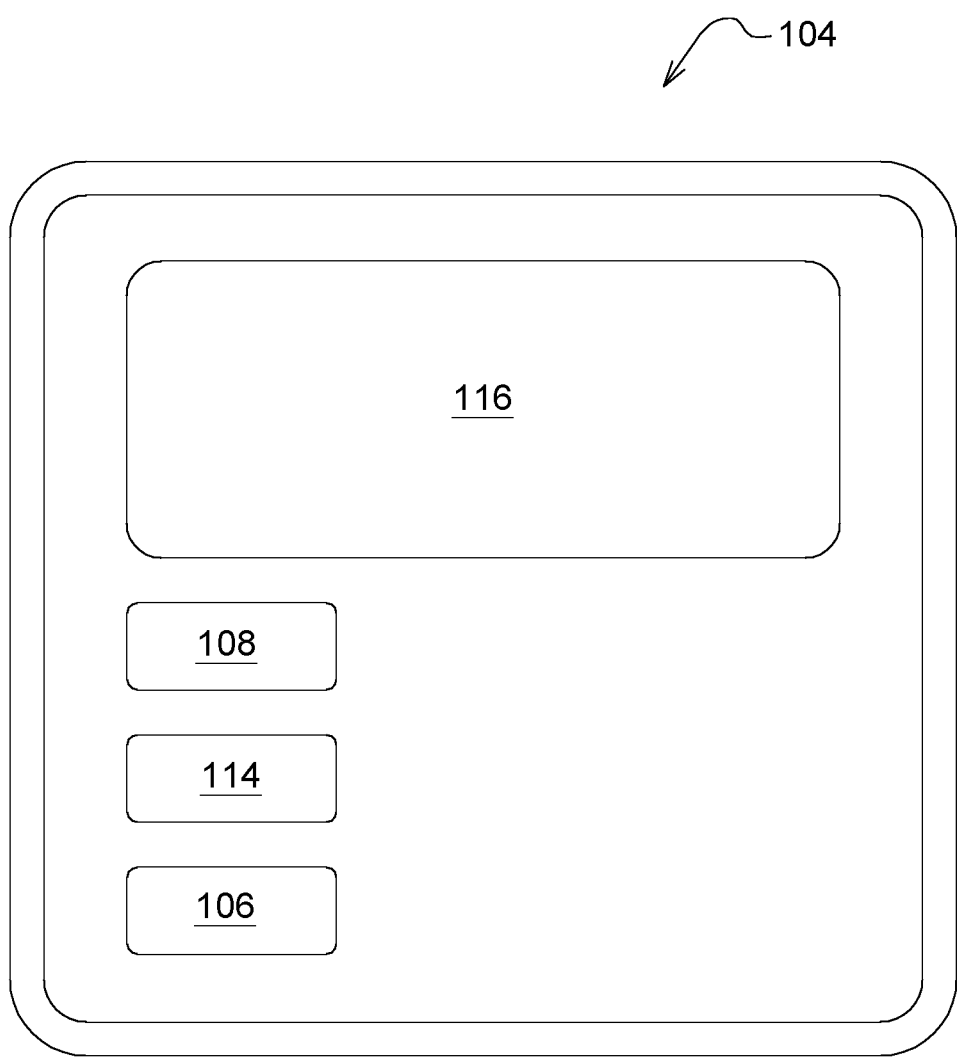
FIG. 6 is a schematic plan view of a display of the baler system.

When the baler controller 96 determines that the pre-set condition is not satisfied the baler controller 96 may then automatically abort the last bale ejection sequence. The step of aborting the last bale ejection sequence when the pre-set condition is not satisfied is generally indicated by box 144 shown in FIG. 7. In doing so, referring to FIG. 6, the baler controller 96 may automatically display an abort notice 108 on the display 104 indicating that the last bale ejection sequence has been aborted because the pre-set condition is not satisfied in a status window 116. In one implementation, the baler controller 96 may be configured to automatically cancel the abort notice 108 when the pre-set condition becomes satisfied. For example, upon receiving the abort notice 108 regarding the pre-set condition, the user may remedy the condition, whereupon the baler controller 96 automatically detects and determines that the pre-set condition is now satisfied and cancels the abort notice 108. In another implementation, referring to FIG. 6, the user may remedy the pre-set condition, and thereafter enter an override command 114 into the baler controller 96 via the touch screen display 104 to cancel the abort notice 108 regarding the pre-set condition.

Upon receiving the command input and determining that all pre-set conditions are satisfied, the baler controller 96 may then automatically connect torque communication between a power supply 110 and the baler implement 24 to power the plunger 56 and the knotter system 58. The step of connecting torque communication to the baler implement is generally indicated by box 146 shown in FIG. 7. Connecting torque communication may include, but is not limited to, engaging a PTO output 32 of the associated traction unit 22 to rotate the input shaft 30 of the baler implement 24, thereby providing power to the baler implement 24 to power the plunger 56 and the knotter system 58.

With power supplied to the baler implement 24, and with the plunger 56 positioned to compress the crop material within the baling chamber 36, the baler controller 96 may then automatically engage the knotter system 58 to wrap and bind crop material currently disposed within the baling chamber 36 to form a final bale. The step of engaging the knotter system 58 is generally indicated by box 148 shown in FIG. 7. The knotter system 58 operates as generally described above, in which the needles 60 pass the twine strands around the bale and the knotters 62 tie the respective twine strands together to form a knot binding the final bale.

Once the knotter system 58 has completed tying the twine strands and binding the final bale, the baler controller 96 may then automatically disengage the plunger 56 from the final bale. The step of disengaging the plunger 56 is generally indicated by box 150 shown in FIG. 7. The plunger 56 may be actuated and moved away from the final bale, thereby releasing pressure on the plunger 56 and the bale. After disengaging the plunger 56 from the final bale, the baler controller 96 may then automatically disconnect torque communication between the power supply 110 and the baler implement 24. The step of disconnecting power to the baler implement 24 is generally indicated by box 152 shown in FIG. 7. Torque communication between the baler implement 24 and the power supply 110 may be disconnected, for example, by disengaging the PTO output 32 of the associated traction unit 22.

Once the final bale is formed and bound with the twine strands, the baler controller 96 may then automatically determine if the discharge location 66 disposed proximate the discharge end 64 of the baling chamber 36 is clear of obstructions or is not clear of obstructions. The step of determining if the discharge location 66 is clear of obstructions is generally indicated by box 154 shown in FIG. 7. The discharge location 66 may be considered the area onto which the final bale will be deposited or ejected. For example, the discharge location 66 may be a trailer or the ground surface immediately behind the baler implement 24. The obstruction may include any object that may interfere with ejection of the final bale. For example, the obstruction may include a person, an animal, another vehicle, a pole, a post, a rock, a ditch, another bale, etc. The baler controller 96 may receive data from a object detector 112, e.g., a proximity sensor, positioned to detect obstructions and/or objects in and around the discharge location 66. For example, the object detector 112 may include an image sensor positioned to capture an image of the discharge location 66, whereby the baler controller 96 may analyze the image to detect and identify objects and/or obstructions in the discharge area. In other embodiments, the object detector 112 may include, but is not limited to, a lidar sensor or a radar sensor.

If the baler controller 96 determines that the discharge location 66 is not clear of obstructions, then the baler controller 96 may automatically abort the last bale ejection sequence. The step of aborting the last bale ejection sequence because the discharge location 66 is not clear of obstructions is generally indicated by box 156 shown in FIG. 7. In doing so, referring to FIG. 6, the baler controller 96 may automatically display an abort notice 108 on the display 104 indicating in the status window 116 that the last bale ejection sequence has been aborted because an obstruction is present in the discharge location 66, i.e., the discharge location 66 is not clear of obstructions. In one implementation, the baler controller 96 may be configured to automatically cancel the abort notice 108 when the obstruction is removed from the discharge location 66. For example, upon receiving the abort notice 108 regarding the obstruction in the discharge location 66, the user may remove the obstruction or relocate the baler implement 24, whereupon the baler controller 96 automatically detects and determines that no obstructions are present in the discharge location 66 and cancels the abort notice 108. In another implementation, referring to FIG. 6, the user may remove the obstruction from the discharge location 66 and/or relocate the baler implement 24, and thereafter enter an override command 114 into the baler controller 96 via the touch screen display 104 to cancel the abort notice 108 regarding the obstruction in the discharge location 66.

Once the baler controller 96 has determined that the discharge location 66 is clear of any obstructions, then the baler controller 96 may automatically engage the bale ejection system 68 to eject the final bale from the baling chamber 36 and onto the discharge location 66. The step of ejecting the final bale is generally indicated by box 158 shown in FIG. 7. As described above, in the example implementation of the bale ejection system 68, the baler controller 96 may repeatedly control the actuator 70 of the bale ejection system 68 between the extended position to engage the bale with the bale engaging member and move the final bale toward the discharge end 64 of the baling chamber 36, and the retracted position to re-set the bale engaging member for the next cycle. The cycle is repeated until the final bale is ejected from the baler implement 24 and deposited at the discharge location 66.

The baler controller 96 may be configured to display the status window 116 on a user interface, such as but not limited to the display 104. The status window 116 may be configured to indicate a current status of the bale ejection sequence. For example, the status window 116 may be updated at the beginning and/or completion of each step described above. Additionally, the status window 116 may be configured to present the reason for the abort notice 108, i.e., the abort notice 108 related to the pre-set condition and/or the abort notice 108 related to obstructions in the discharge area, if required. The system and process described above enable the user to quickly and easily eject the last bale of the baling session with the touch of a button to initiate the automated process.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A baler system comprising:
  a baler implement including a baling chamber and a plunger moveable within the baling chamber in a reciprocating motion to compress crop material into a formed bale having a parallelepiped shape;
  a knotter system having a needle operable to wrap a twine strand around a periphery of the formed bale within the baling chamber and a knotter operable to tie the twine strand to bind the crop material into the parallelepiped shape;
  a bale ejection system having an actuator and a bale engagement member, wherein the actuator is selectively controllable to move the bale engagement member into contact with the formed and bound bale within the baling chamber and thereafter move the bale engagement member to eject the formed and bound bale from the baling chamber through a discharge end of the baling chamber;
  a baler controller including a processor and a memory having a bale ejection algorithm stored thereon, wherein the processor is operable to execute the bale ejection algorithm to:
  receive a command input to initiate a last bale ejection sequence;
  upon receiving the command input, automatically engage the knotter system to wrap and bind crop material currently disposed within the baling chamber to form a final bale;
  upon forming the final bale, automatically determine if a discharge location disposed proximate the discharge end of the baling chamber is clear of obstructions or is not clear of obstructions;
  upon determining that the discharge end of the baling chamber is clear of obstructions, automatically engage the bale ejection system to eject the final bale from the baling chamber and onto the discharge location.

2. The baler system set forth in claim 1, wherein the processor is operable to execute the bale ejection algorithm to display a last bale eject initiation window on a touch screen display, whereby the user may enter the command input by touching the last bale eject initiation window to initiate the last bale ejection sequence.

3. The baler system set forth in claim 1, wherein upon receiving the command input and prior to engaging the knotter system, the processor is operable to execute the bale ejection algorithm to automatically determine if a pre-set condition is satisfied or if the pre-set condition is not satisfied.

4. The baler system set forth in claim 3, wherein the processor is operable to execute the bale ejection algorithm to automatically abort the last bale ejection sequence when the pre-set condition is not satisfied.

5. The baler system set forth in claim 4, wherein the processor is operable to execute the bale ejection algorithm to automatically display an abort notice on a display indicating that the last bale ejection sequence has been aborted because the pre-set condition is not satisfied.

6. The baler system set forth in claim 1, wherein upon receiving the command input, the processor is operable to execute the bale ejection algorithm to automatically connect torque communication between a power supply and the baler implement to power the plunger and the knotter system.

7. The baler system set forth in claim 6, wherein the processor is operable to execute the bale ejection algorithm to automatically disengage the plunger from the final bale after the knotter system has bound the final bale with the twine strand.

8. The baler system set forth in claim 7, wherein after disengaging the plunger from the final bale, the processor is operable to execute the bale ejection algorithm to automatically disconnect torque communication between the power supply and the baler implement.

9. The baler system set forth in claim 1, wherein the processor is operable to execute the bale ejection algorithm to automatically engage the bale ejection system by repeatedly controlling the actuator of the bale ejection system between an extended position and a retracted position until the final bale is ejected from the baler implement and deposited at the discharge location.

10. The baler system set forth in claim 1, wherein upon determining that the discharge location is not clear of obstructions, the processor is operable to execute the bale ejection algorithm to automatically abort the last bale ejection sequence.

11. The baler system set forth in claim 10, wherein the processor is operable to execute the bale ejection algorithm to automatically display an abort notice on a display indicating that the last bale ejection sequence has been aborted because the discharge location is not clear of obstructions.

12. The baler system set forth in claim 11, wherein the processor is operable to execute the bale ejection algorithm to automatically cancel the abort notice when the obstruction is no longer detected in the discharge location.

13. The baler system set forth in claim 1, wherein the processor is operable to execute the bale ejection algorithm to display a status window on a user interface indicating a current status of the last bale ejection sequence.

* * * * *